(12) United States Patent
Nguyen

(10) Patent No.: US 7,362,741 B2
(45) Date of Patent: Apr. 22, 2008

(54) METHOD AND APPARATUS FOR WIRELESS COMMUNICATION NETWORK OPERATING IN COMPRESSED MODE

(75) Inventor: Phong Nguyen, Victoria (AU)

(73) Assignee: NEC Corporation (JP)

( * ) Notice: Subject to any disclaimer, the term of this patent is extended or adjusted under 35 U.S.C. 154(b) by 268 days.

(21) Appl. No.: 11/200,959

(22) Filed: Aug. 10, 2005

(65) Prior Publication Data

US 2006/0034245 A1    Feb. 16, 2006

(30) Foreign Application Priority Data

Aug. 10, 2004   (AU) ............................. 2004904512

(51) Int. Cl.
*H04J 3/00* (2006.01)
(52) U.S. Cl. .................... 370/345; 370/341; 370/395.4; 455/231
(58) Field of Classification Search ................ 370/345, 370/319, 461, 301, 341, 384, 385, 394; 455/226.4, 455/226.2, 226.3, 229, 231
See application file for complete search history.

(56) References Cited

U.S. PATENT DOCUMENTS

2003/0108027 A1* 6/2003 Kim et al. .................. 370/345
2004/0184477 A1* 9/2004 Tavli et al. ................. 370/461
2006/0171345 A1* 8/2006 Hildebrand et al. ........ 370/319
2006/0293008 A1* 12/2006 Hiraki et al. ............. 455/226.4

FOREIGN PATENT DOCUMENTS

EP          1 349 328 A1    10/2003

OTHER PUBLICATIONS

3GPP TSG-RAN: "Interaction between compressed mode and HSDPA"; WG1 Meeting #23; Tdoc R1-02-0034, Espoo, Finland, Jan. 8, 2002, pp. 1-6, XP002385461; URL: http://www.3gp.org/ftp/tsg_ran/WG1_RL1/TSGR1_23/Docs/Zips/R1-02-0034.zip (retrieved on Jun. 14, 2006).

* cited by examiner

*Primary Examiner*—Tan Trinh
(74) *Attorney, Agent, or Firm*—Dickstein, Shapiro, LLP.

(57) ABSTRACT

There is provided a method for use by a user equipment of a Universal Mobile Telecommunication System (UMTS) that supports HSDPA, and a network node in communication with such a user equipment. In an embodiment the method includes, identifying a transmission gap in a downlink transmission from a base station on a first channel. Next the transmission gap is mapped onto a first channel to define a first suspension period encompassing the subframes of the first channel that overlap the transmission gap. The method further includes expanding the first suspension period to define a further period encompassing the subframes of at least one further channel that overlap the first suspension period, and defining a reception suspension period encompassing the further period, and subframes associated with the subframes falling within the further period.

14 Claims, 7 Drawing Sheets

METHOD AND APPARATUS FOR WIRELESS COMMUNICATION NETWORK OPERATING IN COMPRESSED MODE

BACKGROUND OF THE INVENTION

1. Field of the Invention

The present invention relates to a method and an apparatus for wireless communication network, preferably Universal Mobile Telecommunication System (UMTS), operating in compressed mode, and in particular, to the method and the apparatus for use by a user equipment that supports HSDPA, and a network node in communication with such a user equipment.

2. Description of the Related Art

High Speed Downlink Packet Access (HSDPA) is emerging as a promising candidate for providing high bit rate transmission of packetized data in third generation wireless telecommunication networks. It is expected that once implemented Wideband Code Division Multiple Access (WCDMA) networks using HSDPA will be able to provide data transmission at rates in the order of 10 Mbps.

In the HSDPA method, as a physical channel for a downlink through which data are transmitted from a base station to a mobile wireless terminal, an HS-SCCH (High Speed-Shared Control CHannel) and an HS-PDSCH (High Speed-Physical Downlink Shared CHannel) are additionally provided. The HS-SCCH is used to transmit control information of the HS-PDSCH pairing up with the HS-SCCH, while the HS-PDSCH is used to transmit packet data employed in the HSDPA method. Moreover, the HS-PDSCH can use a maximum 15 pieces of channelization codes in units of subframes, which is called a multi-code, and the number of used multicodes is called the multicode number. The subframe denotes a frame length of a physical channel used in the HSDPA method expressed in time units of three slots and a slot denotes a time unit designated by the 3GPP.

The implementation of HSDPA specified by the 3rd Generation Partnership Project (3GPP) requires that any transmission scheme used for HSDPA is compliant with the compressed mode used by UMTS user equipments when performing inter-frequency or inter-system measurement as a preparation for a handover.

As will be known to those skilled in the art a handover is a process whereby the user equipment changes the way in which it access the radio network, for example, by changing cell or radio access mode.

In a UMTS network if a user equipment is required to perform a inter-frequency or inter-system handover, the node B (base station) instructs the user equipment to operate in the compressed mode. In compressed mode a gap is created by obeying predefined patterns in certain radio frames transmitted between the node B and user equipment, in which the node B and user equipment can perform various measurements of network parameters to prepare for the handover. For example, base stations in cells surrounding the current cell of user equipment may perform signal strength measurements for the user equipment in order to determine which of the base stations the user equipment should handoff to. In the downlink direction a transmission gap is inserted into predetermined frames on the Dedicated physical channel (DPCH).

One of the drawbacks of HSDPA is that the high data reception rate at the user equipment requires a large amount of digital signal processing to be performed in the user equipment and this processing burden has a detrimental effect on the battery life of user equipments.

SUMMARY OF THE INVENTION

In view of the above, it is an object of the present invention to provide a method and an apparatus for a wireless communication network operating in compressed mode being capable of overcoming one or more disadvantages of the prior art, for example, capable of saving unnecessary processing power and hence enhancing battery life.

In a first aspect the present invention provides a method of operating a user equipment in compressed mode during high speed downlink packet access (HSDPA) activity, the method including;

identifying a transmission gap in a downlink transmission from a base station;

identifying one or more data subframes that overlap the transmission gap;

determining an reception suspension period encompassing the identified subframes and the transmission gap; and suspending high speed data packet reception by the user equipment during the reception suspension period.

The method can also include suspending processing of HSDPA packets during the reception suspension period.

Preferably the reception suspension period also encompasses data subframes that are associated with the identified data subframes. The reception suspension period may also encompass one or more data subframes having associated data subframes that overlap the transmission gap.

In further embodiments the reception suspension period also encompasses data subframes identified as belonging to the extended transmission gap on the basis of higher network layer parameters.

In the present application a data subframe should be understood as being associated with another data subframe if they form part of the same frame. For example, a high speed shared control channel (HS-SCCH) subframe will have an associated high speed downlink shared channel (HS-DSCH) subframe.

In a further aspect the present invention provides a method of determining a reception suspension period for a user equipment in compressed mode during high speed downlink packet access (HSDPA) activity, the method including:

identifying a transmission gap in a downlink transmission from a base station on a first channel;

mapping the transmission gap onto a first channel to thereby define a first suspension period encompassing the subframes of the first channel that overlap the transmission gap;

expanding the first period to thereby define a further period that encompasses the subframes of at least one further channel that overlap the first suspension period;

defining a reception suspension period encompassing the further period, and subframes associated with the subframes falling within the further period.

Preferably the first channel is a common pilot channel.

The at least one further channel can be selected from a group including, a high speed downlink shared channel and a high speed shared control channel.

The step of defining the reception suspension period can include defining the reception suspension period to additionally encompass one or more data subframes specified on the basis of higher network layer parameters.

In a third aspect there is provided a method for controlling a base station of a cellular telecommunications network communicating with user equipment in compressed mode during high speed downlink packet access (HSDPA) activity, the method including:

Determining a reception suspension period in accordance with any of the above methods; and suspending transmission of HSDPA packets to the user equipment during the determined reception suspension period.

In a further aspect the present invention provides a method of managing power consumption in a user equipment in compressed mode during high speed downlink packet access (HSDPA) activity, including:

determining a reception suspension period in accordance with any of the above methods; and suspending reception and/or processing of HSDPA packets during the reception suspension period.

In a further aspect the present invention provides a user equipment for a Universal Mobile Telecommunication System (UMTS) network configured to be operated in compressed mode during high speed downlink packet access (HSDPA) activity, the user equipment including, a section to identify a transmission gap in a downlink transmission from a base station of the network; a section for identifying one or more data subframes that overlap the transmission gap; a section for determining a reception suspension period encompassing the identified subframes and the transmission gap; wherein the user equipment is configured to suspend high speed data packet reception during the reception suspension period.

Preferably the user equipment is further configured to suspend processing of HSDPA packets during the reception suspension period.

The user equipment is preferably configured to determine a reception suspension period using any one of the methods described herein.

In another aspect the present invention provides a base station of a cellular telecommunications network for communicating with user equipment in compressed mode during high speed downlink packet access (HSDPA) activity, the base station including, a section for determining a reception suspension period for the user equipment in accordance with the method of any one of claims 6 to 9; and a scheduling section for scheduling transmission of HSDPA packets to the user equipment, wherein the scheduling section does not schedule HSDPA packets for transmission to the user equipment during the determined reception suspension period.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

According to 3GPP Rel'5 specification 25.214 when a WCDMA user equipment is operating in compressed mode the user equipment shall neglect a high speed physical channel shared control channel (HS-SCCH) or high speed physical downlink shared channel (HS-PDSCH) transmission if a part of the HS-SCCH subframe or a part of its associated HS-PDSCH subframe overlaps with a downlink transmission gap on the associated DPCH.

In this regard the inventor has identified that the reception and/or decoding of HSDPA data can be suspended during an extended period (herein referred to as a reception suspension period (RSP)) that includes at least the time period in which these "neglected" subframes would be received. In certain embodiments the suspension of the HSDPA activity in RSP may advantageously serve to decrease the impact on battery resources of a user equipment when conducting HSDPA activities in compressed mode.

Figure 1:
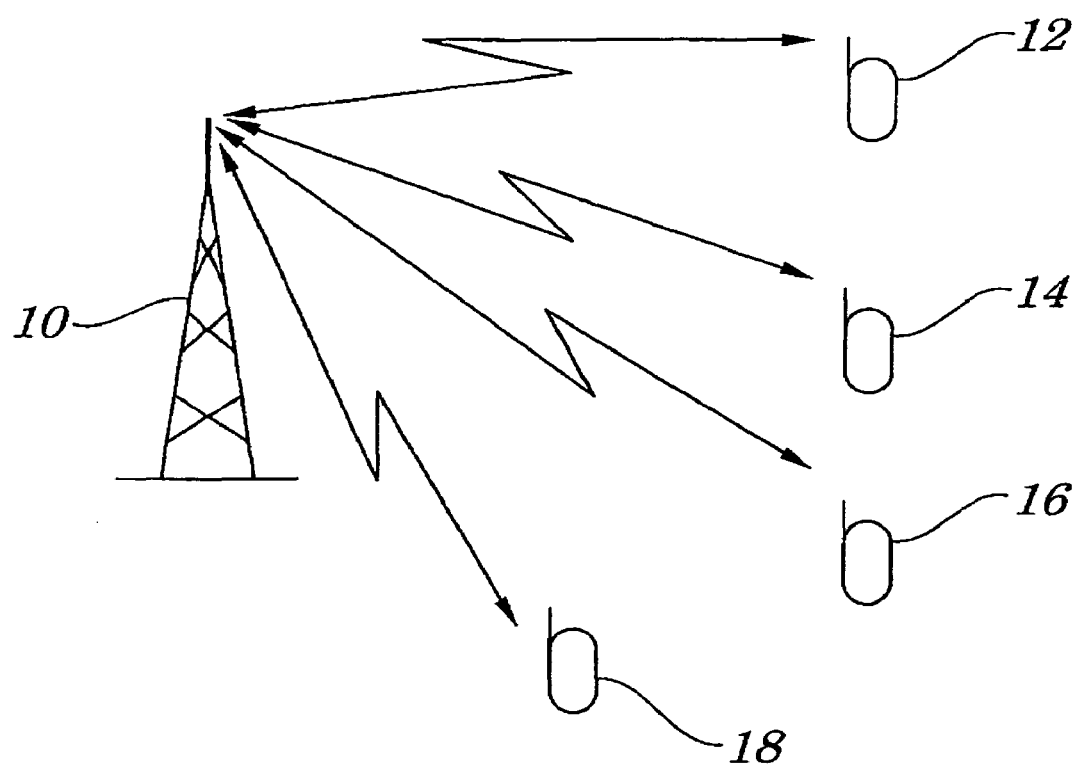
FIG. 1 depicts a schematic representation of a system sending a HSDPA service operating in compressed mode in accordance with an embodiment of the present invention.

FIG. 1 depicts a schematic diagram of a base station 10 in communication with four user equipments 12, 14, 16, 18 that are each receiving an HSDPA service. The user equipments 12 to 18 share the HSDPA channel resources of the base station 10 by either code division multiplexing or time division multiplexing or a combination of both. The method of multiplexing is determined by an HSDPA packet scheduler of the base station 10.

In the present example, the user equipment 18 has been scheduled to operate in compressed mode. As described above, while a user equipment 18 is operating in compressed mode, there exists a transmission gap in which HSDPA packets are not sent to the user equipment, and where certain received packets can be "neglected" by the user equipment.

Figure 2:
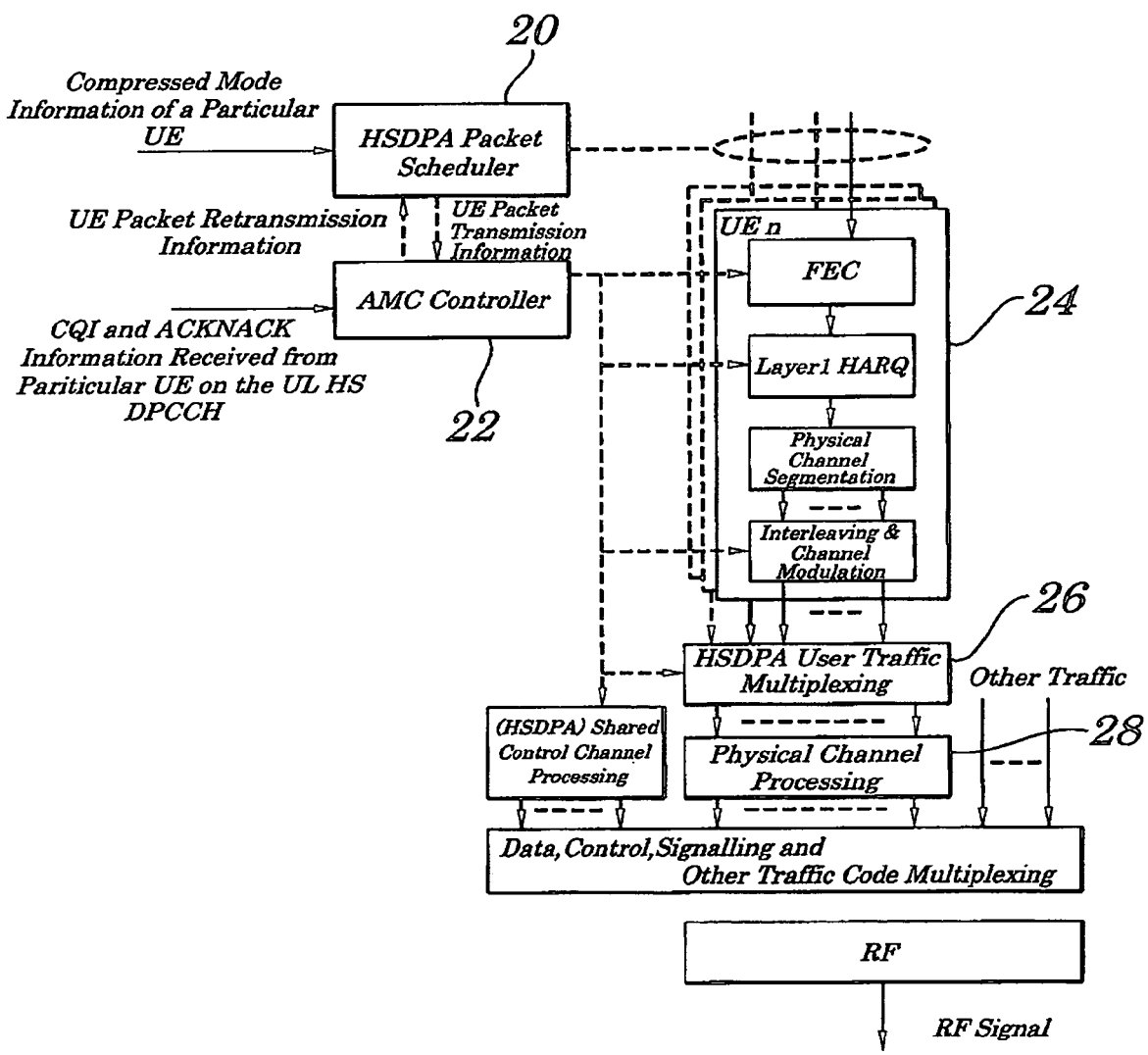
FIG. 2 is a block diagram of a HSDPA packet scheduling and transmission processing arrangement of a base station operating in accordance with an embodiment of the present invention.

FIG. 2 shows a more detailed schematic block diagram of part of the base station 10 of FIG. 1. In particular, FIG. 2 depicts a block diagram of the MAC-hs protocol layer of the base station 10, in which scheduling of HSDPA transmission is performed in the base station.

The arrangement of the HSDPA packet scheduling and transmission processing portion of the base station is similar to a conventional base station capable of transmitting HSDPA services, with the exception of the operation of the HSDPA packet scheduler 20 and Adaptive Modulation and Coding (AMC) controller 22. In accordance with the methods described below, the HSDPA packet scheduler 20 controls the use of the resources available for HSDPA in each transmission time interval to perform packet transmission scheduling so that the channel capability reserved for HSDPA service is optimised.

In this regard, the HSDPA packet scheduler 20 also calculates the extent of the transmission gap for any user equipment (e.g. UE 18) that is operating in compressed mode and schedules HSDPA packets so as to enforce the packet transmission suspension for that user equipment during the calculated extended transmission gap.

During the period extended transmission gap the HSDPA packet scheduler 20 is able to schedule HDSPA packets for transmission to other user equipments to improve the HSDPA system throughput.

The AMC controller performs the packet processing, including changing channel coding, changing retransmission version, changing channel modulation scheme for any user equipment according to channel quality and packet acknowledgment reported from a user equipment. For a given user equipment, the AMC controller 22 receives Channel Quality Indicator (CQI), and ACK/NACK information and uses this data to calculate parameters for the retransmission of old packets or transmission of a new packets. The extended transmission gap data information for a particular UE is passed to the AMC controller 22 from The HSDPA packet scheduler 20 to enable the processing of packet transmission/retransmission.

According to an embodiment of the present invention the HSDPA packet scheduler 20 does not schedule any new or retransmitted packet to a UE operating in compressed mode during the calculated extended transmission gap. As will be apparent from the following discussion the HSDPA packet scheduler 20 can utilise the radio resources freed-up by this process for transmitting HSDPA packet to other user equipment within the cell.

The HSDPA data packets for each UE (e,g, UEs 12 to 18 of FIG. 1), as scheduled by the HSDPA packet scheduler 20, are then further processed by convention processing blocks 24, before multiplexing in block 26 and physical channel processing in block 28 per current 3GPP Rel'5 and Rel'6 HSDPA requirements.

Figure 3:
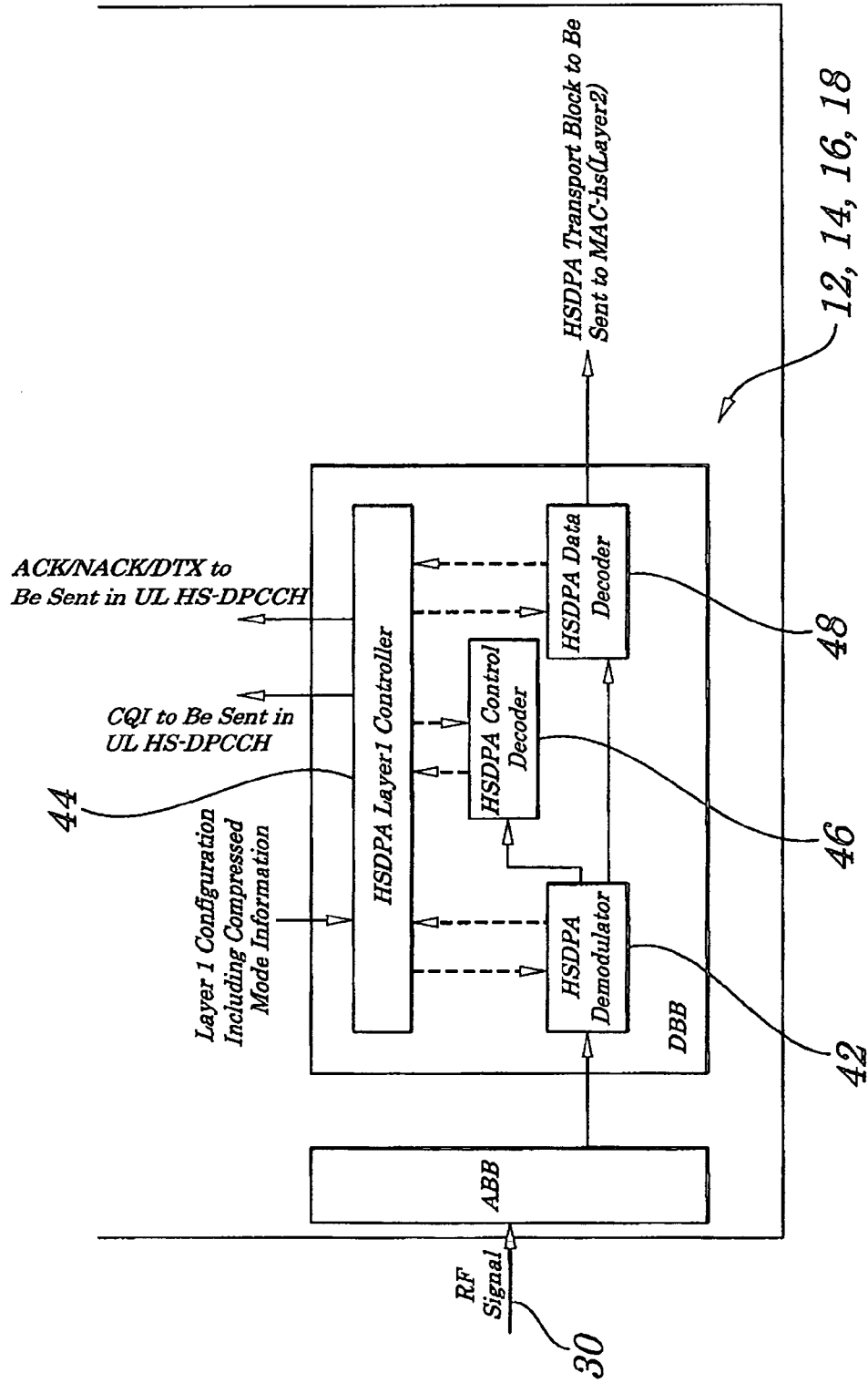
FIG. 3 is a schematic block diagram of the layer 1 processes taking place in a user equipment according to an embodiment of the present invention.

FIG. 3, which shows a schematic view of the relevant layer 1 components of a user equipment (e.g. UE 18) configured to be used in implementations of the present invention. In this regard the user equipment (e.g. UE 12 of FIG. 1) receives a radio frequency signal 30. The HSDPA demodulator 42 demodulates the HSDPA data received on the digital base band. Control channel data is passed to the HSDPA Layer 1 controller 44 to enable control of the decoding of the received HSDPA data by the HSDPA control decoder 46. HSDPA data is passed to the HSDPA data decoder 48. As will be appreciated from the following description of embodiments of the present invention, when the UE 40 is operating in compressed mode the HSDPA Layer 1 controller 44 is adapted to compute a reception suspension period, in the manner described below, during which the operation of the HSDPA demodulation stage and other blocks can serve to save power.

Figure 4:
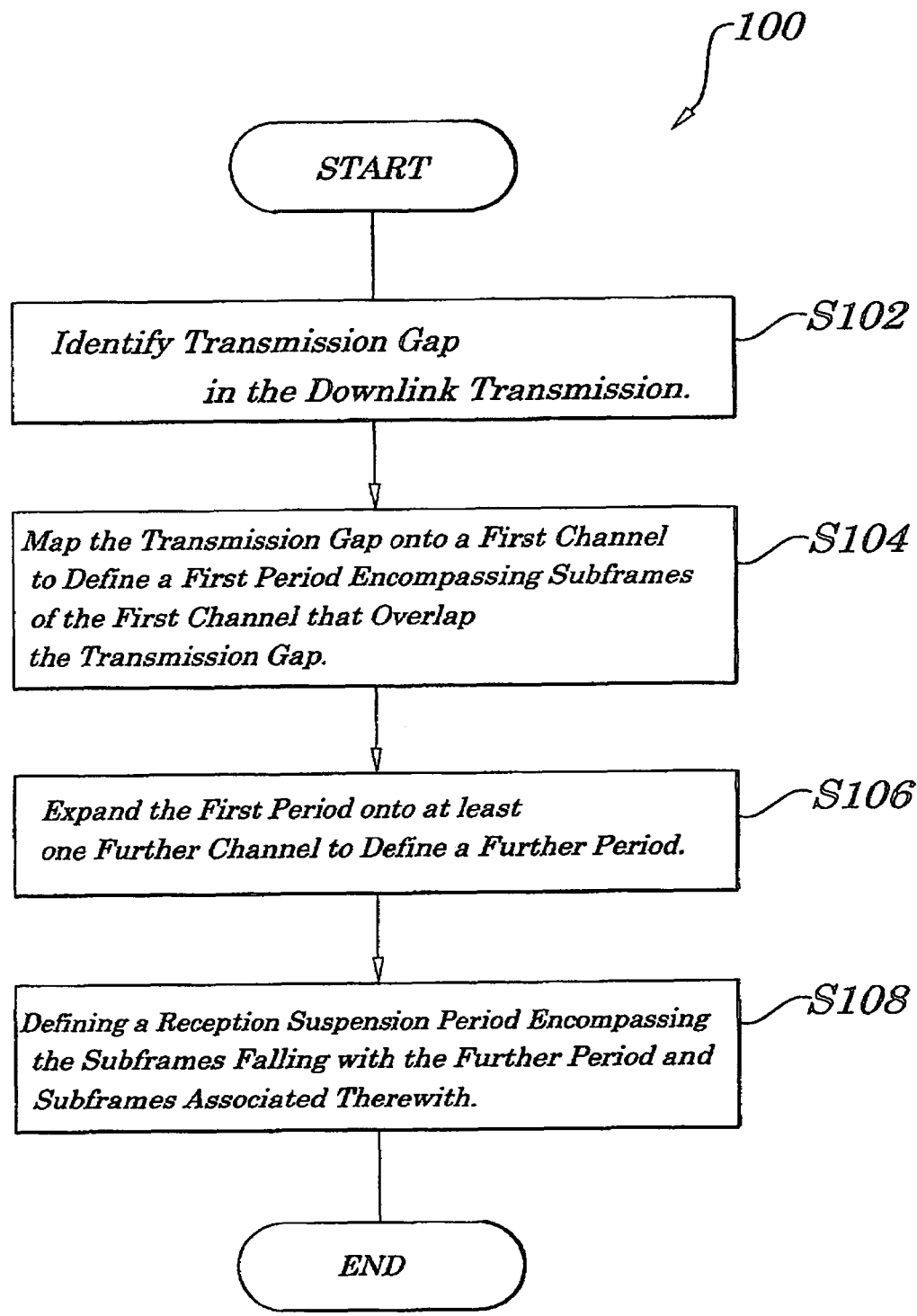
FIG. 4 shows a flowchart showing the steps in a method of defining a reception suspension period in an embodiment of the present invention.

In practice, the reception suspension period (RSP) can be determined for a user equipment operating in compressed mode during HSDPA activity according to the method depicted in FIG. 4. The method 100 begins 102 when the user equipment is directed by the node B to enter compressed mode. In compressed mode transmissions in the downlink physical channel (DPCH) will include a transmission gap (TG), having a set transmission gap length (TGL) in certain data frames.

The method begins (step 102) by identifying a transmission gap in the DPCH transmission from a base station. Next (step 104) the transmission gap is mapped onto the common pilot channel (CPICH) to determine a first period. The first period is determined by ascertaining which slots on the CPICH will overlap the TG, and defining the first period, as beginning at the start of the CPICH slot that overlaps the beginning of the TG, and ending at the end of the CPICH slot that overlaps the end of the TG.

Next, in step 106, the first period is expanded to define a second period that encompasses high speed physical channel shared control channel (HS-SCCH) subframes and/or high speed physical downlink shared channel (HS-PDSCH) subframes which overlap the first period. The second period begins at the start of the HS-SCCH or HS-PDSCH subframe that overlaps the beginning of the first period, and ends at the end of the HS-SCCH or HS-PDSCH subframe that overlaps the end of the first period.

Finally, in step 108 the RSP can be determined. In general the RSP will be defined as beginning a the earliest of; the beginning of the TG; the beginning of the first period; and the beginning of the second period or the start of a subframe associated with a subframe falling within the second period; and will end at the latest of; the end of the TG; the end of the first period; and the end of the second period.

Figure 5:
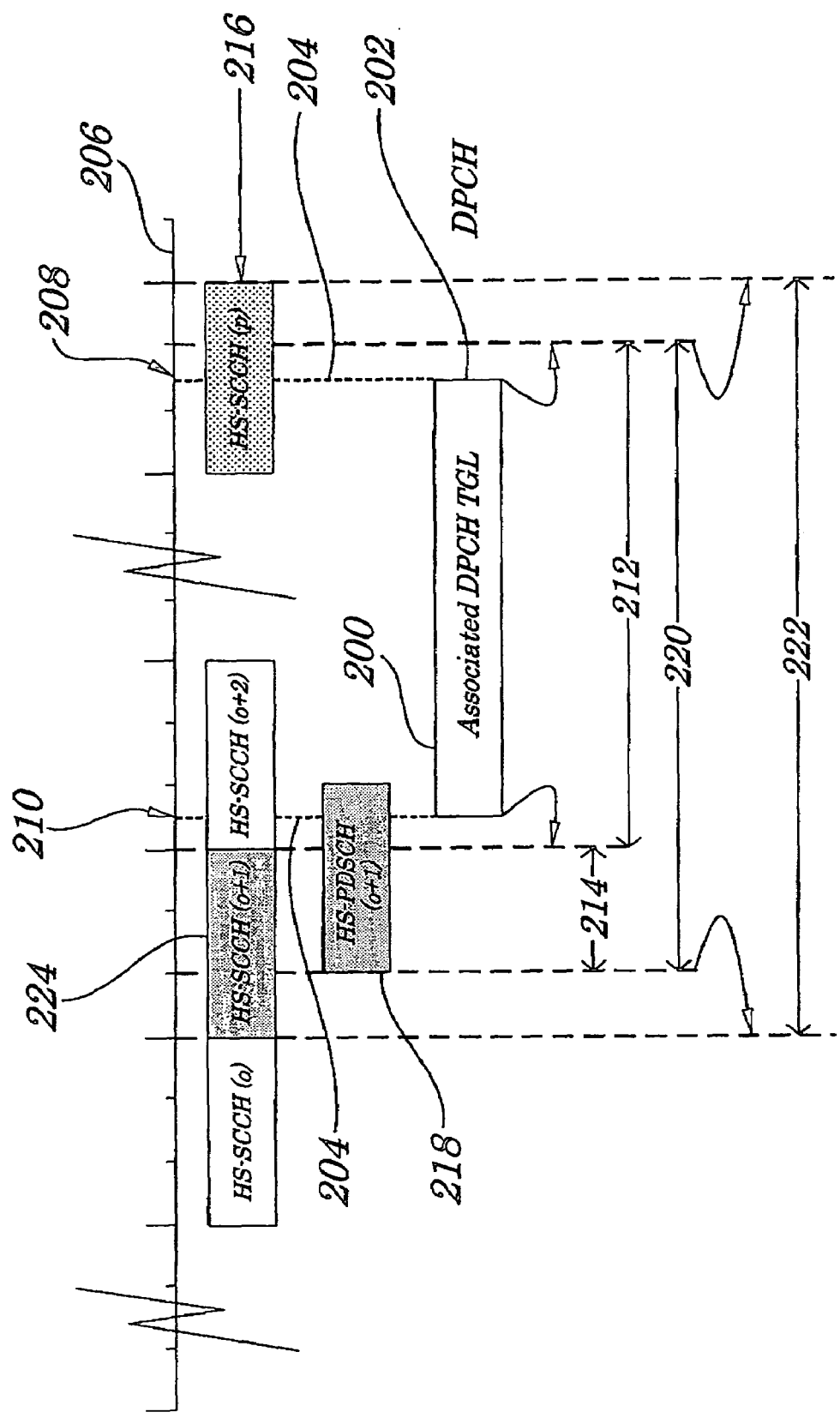
FIG. 5 shows a diagram illustrating the mapping of a transmission gap on the DPCH onto other channels in a WCDMA network using in an embodiment of the present invention.

The process can be further explained with reference to FIG. 5 illustrating relative timing of transmissions on the CPICH, HS-SCCH and DPCH. In accordance with the method described above in connection with FIG. 4, the transmission gap 202 in the DPCH transmission 200 is mapped 204 onto the CPICH 206 (Step 104). The mapping is used to determine those slots 208, 210 on the CPICH that will overlap the transmission gap 202.

The first period 212 can then be defined, which begins at the start of CPICH slot 210 which overlaps the beginning of the TG 202 and ending at the end of CPICH slot 208 that overlaps the end of the TG 202.

This first period 212 can then be expanded 214 to define a second period 220 that encompasses any frames of the high speed physical channel shared control channel (HS-SCCH) 216, or high speed physical downlink shared channel (HS-PDSCH) 218 that overlap the first period 212.

Finally, the RSP 222 can be determined. In general the RSP 222 will be defined as beginning a the earliest of; the beginning of the TG 202 ; the beginning of the first period 212; and the beginning of the second period 220; or the beginning of a subframe 224 associated with a subframe falling within the second period 220, and will end at the latest of; the end of the TG 202; the end of the first period 212; and the end of the second period 220. Thus, although HS-SCCH subframe 224 does not overlap the first period 212 it is deemed to lie within the RSP 222 as its HS-PDSCH subframe 218 overlaps the first period 212.

Figure 6:
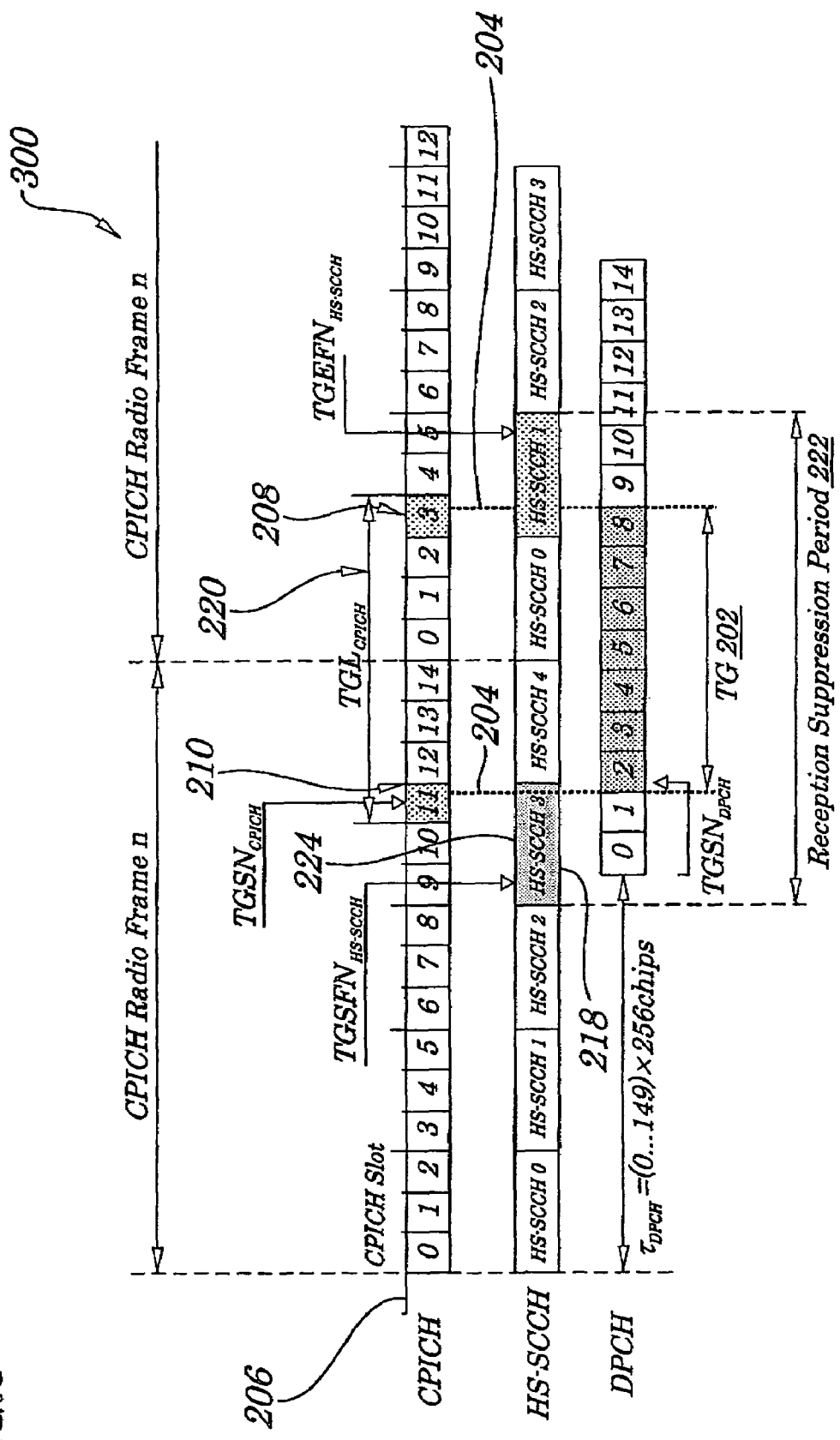
FIG. 6 shows a diagram illustrating a more detailed view of the mapping of the transmission gap on the DPCH onto other channels in a WCDMA network using in an embodiment of the present invention.

FIG. 6 depicts the relationship between the timing of transmissions on the CPICH, HS-SCCH and DPCH and the TG, and the corresponding first period, second period and reception suppression period (RSP) in greater detail, and will be used to describe how the RSP can be calculated by a user terminal. Where possible reference numerals corresponding those used in FIG. 5 will be used in the description of FIG. 6.

A determination as to when reception can be suspended, that is, when the RSP begins and the duration of the RSP can be made as follows.

Initially a determination is made as to which CPICH slot numbers $TGSN_{CPICH}$ (210) overlap with the start of the transmission gap 202. This can be done by applying the following formula.

$$TGSN_{CPICH} = \left\lfloor \frac{\tau_{DPCH}}{10} \right\rfloor + TGSN_{DPCH}$$

Where $\tau_{DPCH}$ is the DPCH from offset given by a higher layer; and $TGSN_{DPCH}$ is the DPCH slot number at the start of the transmission gap 202.

The length of the first period 220 and hence the CPICH slot overlapping the end of the TG202 can be determined as follows:

If $\tau_{DPCH}$ mod 10=0 then $TGL_{CPICH}$=$TGL_{DPCH}$;

else $TGL_{CPICH}$=$TGL_{DPCH}$+1.

In FIG. 6 the length of first period is shown as $TGL_{CPICH}$ 220.

Next the HS-SCCH subframes that overlap the first period 220 and consequently one mode are affected by compressed transmission gap are identified as follows.

The HS-SCCH Subframe number of the HS-SCCH subframe at the start of the second period indicated on FIG. 6 as $TGSFN_{HS\text{-}SCCH}$ or 218 is determined using the following formulae:

If $TGSN_{CPICH}$=2, 5, 8, 11 or 14 then $$TGSFN_{HS\text{-}SCCH} = \left\lfloor \frac{TGSN_{CPICH}}{3} \right\rfloor$$

otherwise $$TGSFN_{HS\text{-}SCCH} = \left\lfloor \frac{TGSN_{CPICH}}{3} \right\rfloor - 1 \text{ and}$$

If $TGSFN_{HS\text{-}SCCH}$<0, then $TGSFN_{HS\text{-}SCCH}$=4 of the previous CPICH frame.

The number of the HS-SCCH Subframe including the end of the second period, indicated by $TGEFN_{HS\text{-}SCCH}$ in FIG. 6 can be determined using the following formula:

$$TGEFN_{HS\text{-}SCCH} = \left\lfloor \frac{(TGSN_{CPICH} + TGL_{CPICH}) \bmod 14}{3} \right\rfloor$$

If $(TGSN_{CPICH}+TGL_{CPICH})$>14 then the $TGEFN_{HS\text{-}SCCH}$ ends in the CPICH frame which is $$\left\lfloor \frac{(TGSN_{CPICH} + TGL_{CPICH})}{14} \right\rfloor$$

frames away from the CPICH frame which contains the start of the first period $TGSN_{CPICH}$ 210.

All HS-SCCH subframes within the second period, that is, all HS-SCCH subframes between $TGSFN_{HS\text{-}SCCH}$ and $TGEFN_{HS\text{-}SCCH}$ are considered to fall within the RSP, and accordingly thus in the present embodiment the RSP shall be the period from the $TGSFN_{HS\text{-}SCCH}$ and $TGEFN_{HS\text{-}SCCH}$.

As will be appreciated the transmission gap can be identified in advance of the user equipment changing into compressed mode, e.g. upon receipt of control data from a node B directing it to do so. This allows the user equipment to suspend the reception and processing of packets on the HS-SCCH channel and its associated HS-PDSCH for the identified RSP to save unnecessary processing power and hence to enhance battery life.

Figure 7:
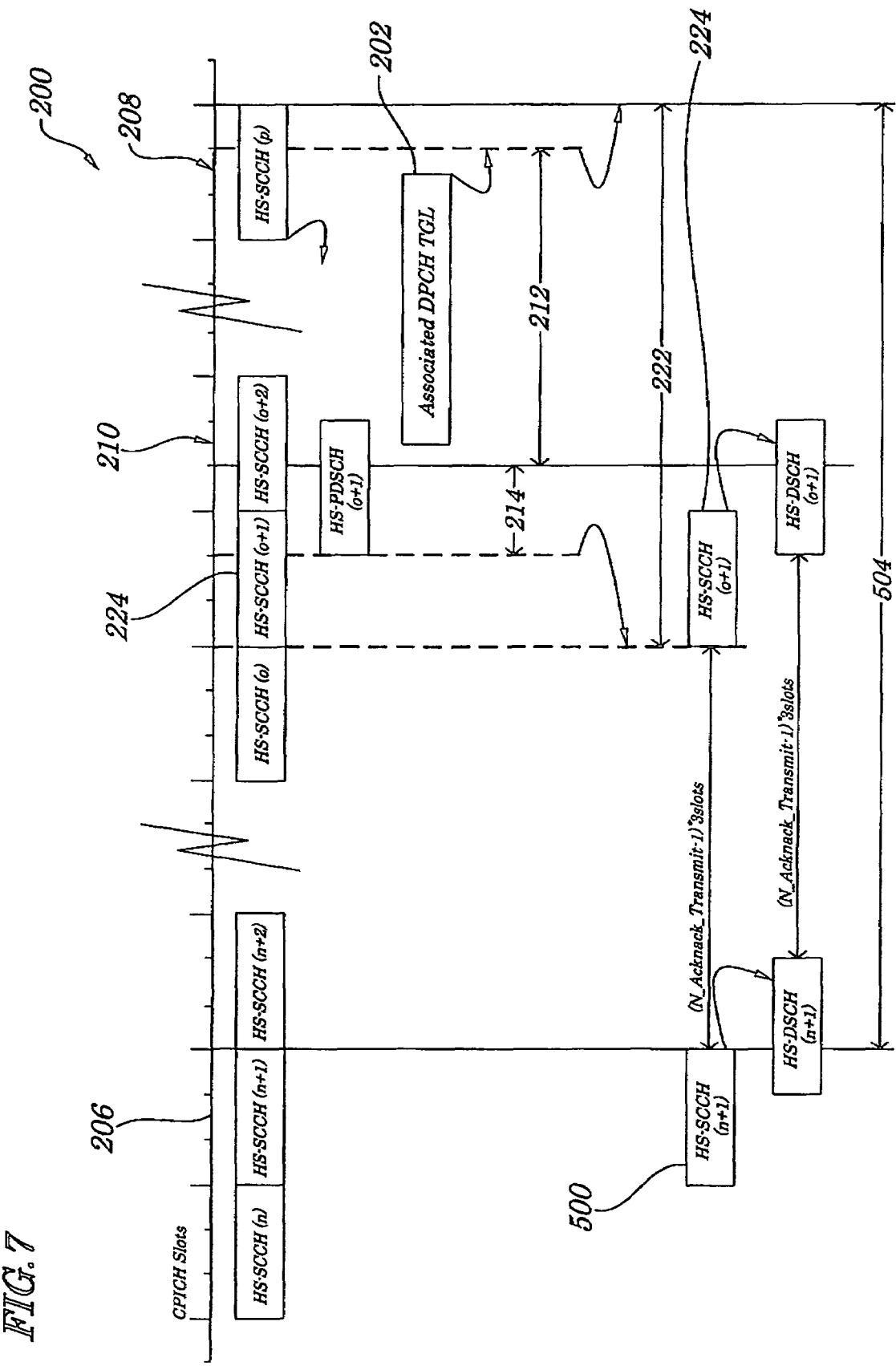
FIG. 7 shows a diagram illustrating how data subframes specified on the basis of higher network layer parameters can be used to define an extended reception suspension period in an embodiment of the present invention.

In a further exemplary embodiment of the present invention the RSP can be extended to take account of control information from higher layers. For example when a user equipment is undergoing HSDPA activity in accordance with 3 GPP specification TS 25.214, the user equipment supporting HSDPA is mandated not to receive nor decode transport blocks from the HS-PDSCH in the HS-DSCH (High Speed-Downlink Shared Channel; transport channel) sub-frames n+1 to n+(N_acknack_transmit−1). Where the N_acknack_transmit parameter is given from higher layer signalling. As depicted in FIG. 7 the RSP can be extended to include this additional group of subframes.

FIG. 7 shows the relationship between the timing of transmissions on the CPICH, HS-SCCH and DPCH and the TG, and the corresponding derived reception suppression period (RSP) of FIG. 5. It also shows the HS-SCCH and the HS-DSCH sub-frames n+1 to n+(N_acknack_transmit−1) mandated as non reception subframes by a higher layer.

As can be seen in FIG. 7 the RSP 222 is initially defined in the same manner described in relation to FIG. 5. However as described above when an apparatus supporting HSDPA has detected control information intended for it in the HS-SCCH sub-frame (n+1) the apparatus can stop receiving/decoding data after the associated HS-DSCH sub-frame (n+1). Knowing N_acknack_transmit it is possible to calculate in advance the next HS-SCCH subframe, that is subframe HS-SCCH (o+1) (indicated by reference numeral 224 in FIG. 7) at which the monitoring of HS-SCCH should resume. However as shown in FIG. 7 if the subframe HS-SCCH (o+1) 224 resides within the RSP 222 the user equipment supporting HSDPA shall be able to extend the RSP 222.

An extended RSP 504 can be defined to extend from the first ignored HS-SCCH subframe 500, that is, subframe (n+2) to the end of the initial RSP. This shall give effective RSP 504 in which all HSDPA activities, with the exception of completing decoding data packet from the HS-DSCH subframe (n+1), can serve to save processing power.

In accordance with a further aspect of the present invention a base station in communication with a user equipment can temporarily suspend transmission to the user equipment during the reception suspension period. In this regard, the node B has access to all relevant data to enable it to calculate the RSP using the same method as used by the user equipment. Thus the base station can suspend transmission of data packets which will not be received by the user equipment.

As will be appreciated by those skilled in the art by suspending transmission from the base station to the user equipment during the RSP calculated by the user equipment the resources of the base station are conserved and are able to be applied to other activities. As will be appreciated this may lead to a more efficient usage of the network resources such as code sharing and transmit power.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method of operating a user equipment in compressed mode during high speed downlink packet access activity, the method comprising;

identifying a transmission gap in a downlink transmission from a base station;
identifying one or more data subframes that overlap the transmission gap;
determining a reception suspension period encompassing the identified subframes and the transmission gap; and
suspending high speed data packet reception by the user equipment during the reception suspension period.

2. A method as claimed in claim 1 wherein the method further comprises, suspending processing of high speed downlink packet access packets during the reception suspension period.

3. A method as claimed in claim 1 wherein the reception suspension period also encompasses data subframes that are associated with the identified data subframes.

4. A method as claimed in claim 1 wherein the reception suspension period encompasses one or more data subframes having associated data subframes that overlap the transmission gap.

5. A method as claimed in claim 1 wherein the reception suspension period encompasses data subframes identified as belonging to an extended transmission gap on the basis of higher network layer parameters.

6. A method of determining a reception suspension period for a user equipment in compressed mode during high speed downlink packet access activity, the method comprising:
identifying a transmission gap in a downlink transmission from a base station;
mapping the transmission gap onto a first channel to thereby define a first suspension period encompassing the subframes of the first channel that overlap the transmission gap;
expanding the first suspension period to thereby define a further period that encompasses the subframes of at least one further channel that overlap the first suspension period; and
defining a reception suspension period encompassing the further period, and subframes associated with the subframes falling within the further period.

7. A method as claimed in claim 6 wherein the first channel comprises a common pilot channel.

8. A method as claimed in claim 6 wherein the at least one further channel comprises a high speed downlink shared channel and/or a high speed shared control channel.

9. A method as claimed in claim 6 wherein the step of defining the reception suspension period comprises defining the reception suspension period to additionally encompass one or more data subframes specified on the basis of higher network layer parameters.

10. A method for controlling a base station of a cellular telecommunications network communicating with user equipment in compressed mode during high speed downlink packet access activity, the method comprising:
determining a reception suspension period using a method according to claim 6; and
suspending transmission of high speed downlink packet access packets to the user equipment during the determined reception suspension period.

11. A method of managing power consumption in a user equipment, for a cellular telecommunications network, operating in compressed mode during high speed downlink packet access activity, comprising:
determining a reception suspension period using a method according to claim 6; and
suspending reception and/or processing of high speed downlink packet access packets during the reception suspension period.

12. A user equipment for a Mobile Telecommunication System network configured to be operated in compressed mode during high speed downlink packet access activity, the user equipment comprising:
a section to identify a transmission gap in a downlink transmission from a base station of the network;
a section for identifying one or more data subframes that overlap the transmission gap; and
a section for determining a reception suspension period encompassing the identified subframes and the transmission gap; and
wherein the user equipment is configured to suspend high speed data packet reception during the reception suspension period.

13. A user equipment as claimed in claim 12, further configured to suspend processing of high speed downlink packet access packets during the reception suspension period.

14. A base station of a cellular telecommunications network for communicating with user equipment in compressed mode during high speed downlink packet access activity, the base station comprising:
a section for determining a reception suspension period for the user equipment in accordance with the method according to claim 6; and
a scheduling section for scheduling transmission of high speed downlink packet access packets to the user equipment, and
wherein the scheduling section does not schedule high speed downlink packet access packets for transmission to the user equipment during the determined reception suspension period.

* * * * *